June 11, 1929.  C. W. BLACK  1,716,615
LOUD SPEAKER
Filed March 3, 1928  3 Sheets-Sheet 1
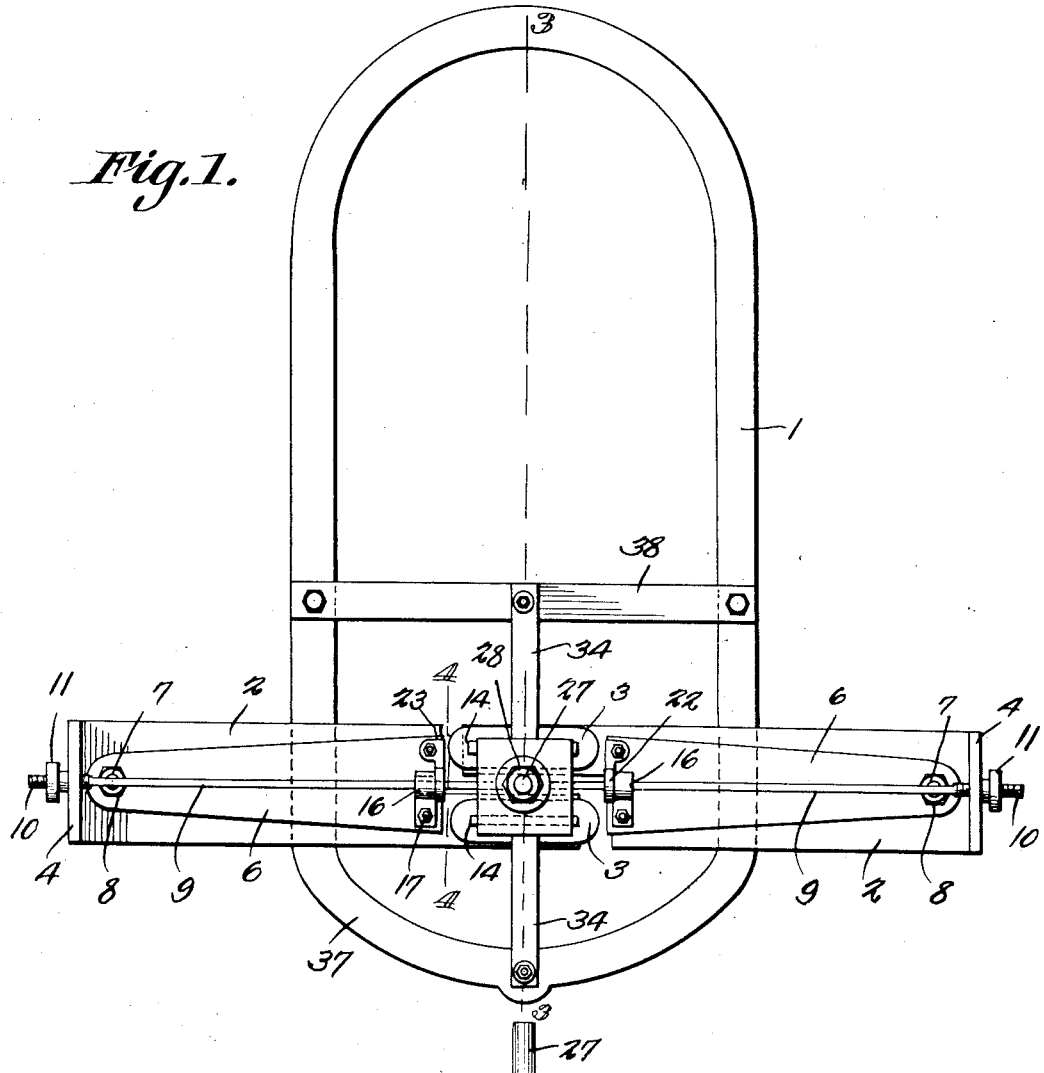
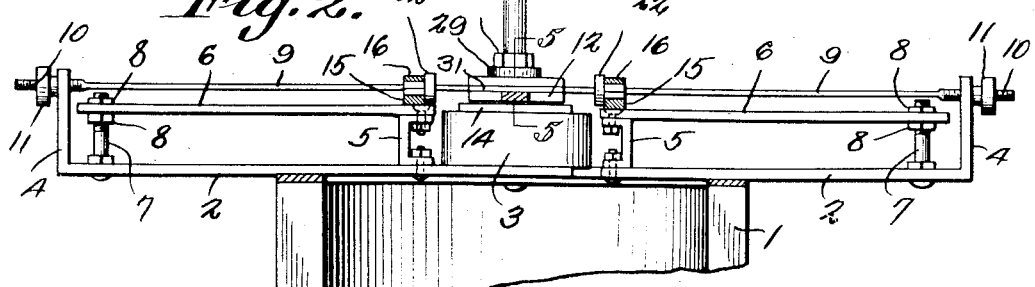
C. W. Black, Inventor
By C. A. Snow & Co.
Attorneys June 11, 1929.  C. W. BLACK  1,716,615
LOUD SPEAKER
Filed March 3, 1928  3 Sheets-Sheet 2
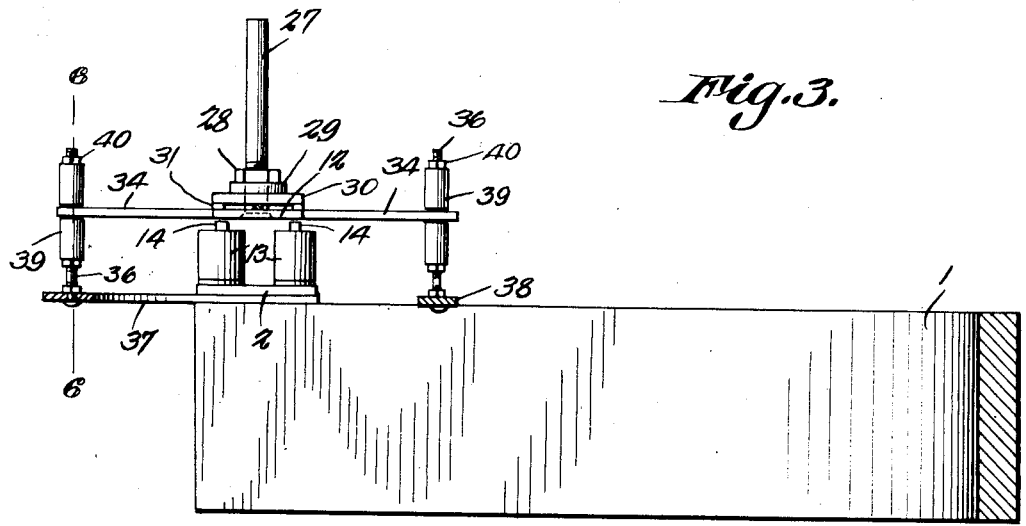
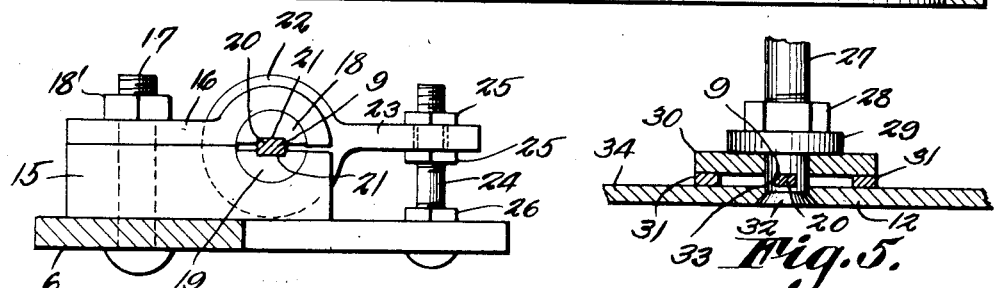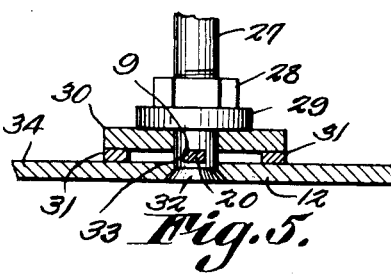
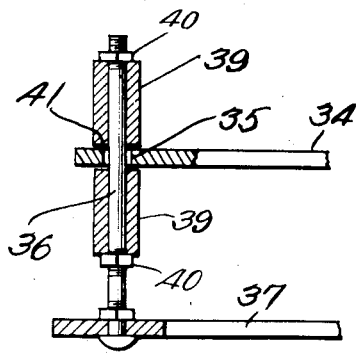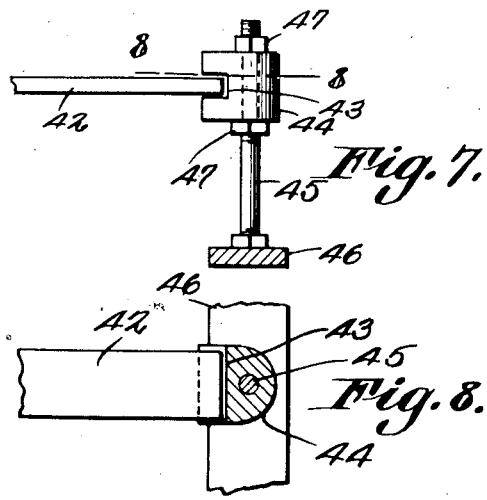
C. W. Black
Inventor
By C. A. Snow & Co.
Attorneys June 11, 1929.　　　C. W. BLACK　　　1,716,615
LOUD SPEAKER
Filed March 3, 1928　　　3 Sheets-Sheet 3
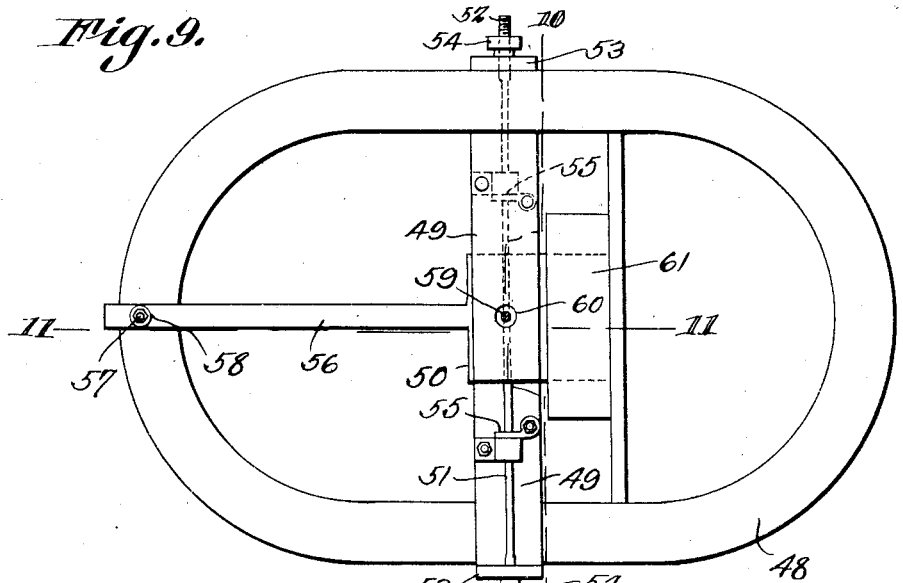
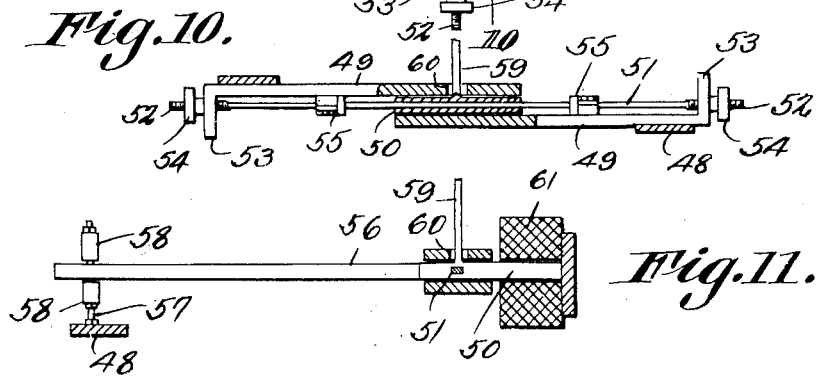
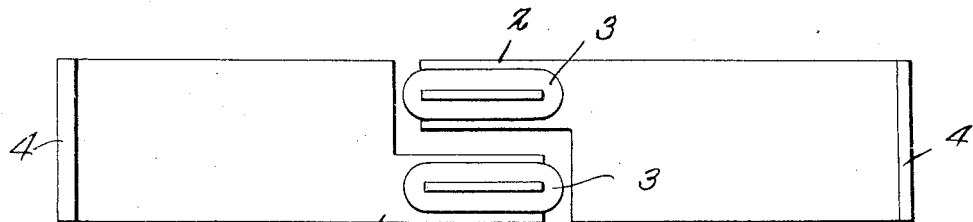
C. W. Black
Inventor Patented June 11, 1929.

1,716,615

UNITED STATES PATENT OFFICE.

CORYDON W. BLACK, OF COUNCIL GROVE, KANSAS.

LOUD-SPEAKER.

Application filed March 3, 1928. Serial No. 258,886.

This invention relates to that class of reproduction units designed and intended for the purpose of converting electrical impulses into audible sound, the particular object being to produce a mechanical device having the various and combined features essential to the conversion of electrical impulses into perfectly natural and clear sound, it being understood, of course, that the terminals of the electromagnets are to be connected to the output of a radio receiving set, or a telephone, or to the output of any device transmitting electrical impulses.

My invention embraces principally a suspended armature, which, by reason of a perfect combination of tension and balance in the supporting cable, is made practically to float in the air, in close proximity to the poles of an electromagnet, thereby receiving the magnetic impulses from the poles with such slight resistance, or bind, from its supporting cable, as to vibrate in perfect synchronism to the magnetic impulses. The sound produced by these vibrations being amplified to such degree as is desired, by attaching to the armature a parchment, fiber or wood cone, or a cone made of any other material; or, if preferred, a convex, concave, or flat disc, square or oblong amplifying board, or other device of any material whatsoever.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Figure 1 is a plan showing the arrangement of parts in such manner as has been found most advantageous in producing the tension and balance so necessary to the conversion of the electrical magnetic impulses into a natural and clear reproduction of the sound waves, which, in the beginning, created the electrical impulses;

Figure 2 is a side elevation showing the electromagnets and the balancing armature in detail;

Figure 3 is a section on the line 3—3 of Figure 1;

Figure 4 is a section on the line 4—4 of Figure 1;

Figure 5 is a section on the line 5—5 of Figure 2;

Figure 6 is a section on the line 6—6 of Figure 3;

Figure 7 is an elevation showing a modified stop;

Figure 8 is a section on the line 8—8 of Figure 7;

Figure 9 is a plan showing a modification;

Figure 10 is a section on the line 10—10 of Figure 9;

Figure 11 is a section on the line 11—11 of Figure 9;

Figure 12 is a plan showing the supporting bars which are used in the form delineated in Figure 1.

All drawings are, for convenience and clarity, an enlargement of size and parts found to be most advantageous in actual service.

Figure 1 shows a permanent magnet 1, to which are attached the two lateral supporting bars 2. To the inner ends of these supporting bars 2 are attached electromagnets 3, while the outer ends 4 are bent to form an L. The fulcrum supports 5 are attached to the support bars 2, close to the electromagnets 3. The adjusting bars, or levers 6 are attached to these fulcrum supports 5 and are connected to the support bars 2 by adjusting bolts 7 and adjusting nuts 8, as shown in Figure 2. To this inner ends of the adjusting levers 6 are attached the cable supporting and balancing devices, a detail of which is shown in Figure 4. The outer ends of a flexible cable 9 are provided with short threaded terminals 10, passing through holes in the ends 4 of the bars 2, and have knurled nuts 11, whereby the tension of the cable 9 is adjusted. By adjusting the outer ends of the levers 6, through the instrumentality of the nuts 8, the relative proximity of the armature 12 to the poles 14 of the electromagnets 3 is adjusted to a fine degree.

The cable supporting and balancing devices, one of which is shown in Figure 4, consist of supporting brackets, or boxings, of which 15 is the base and 16 the cap. The bolt 17 and the nut 18' secure the bracket in proper position on the inner end of the adjusting levers 6, and hold securely the balancing pivots 18 and 19. The supporting cable 9 is preferably made square or oblong in cross section, as shown at 20, and passes through the center of the pivots 18 and 19, which are provided with recesses 21 in which the square or oblong part 20 of the cable 9 fits closely. The cable shown in the drawings is oblong in cross section, as at 20, and although that form is not insisted upon, it is now regarded as preferable. The pivots 18 and 19 are made in two halves, the upper half 19 being provided with the flange 22, and with the adjusting or balancing arm 23. By means of the adjusting bolt 24 on one of the levers 6, and the adjusting nuts 25, the supporting cable 9 is rocked, so as to provide the exact balance whereby the armature 12 is supported and held in perfect lateral relation to the magnet poles 14, as shown in Figures 2 and 3. The nut 18' is then tightened on the bolt 17, thereby clamping securely in position the two halves 18 and 19 of the cable pivot upon the cable 9, as well as securing the bracket members 16 and 15, as a whole, to the adjusting lever 6. The nut 26 is merely to lock the bolt 24 firmly to the adjusting lever 6, the adjusting nuts 25 being threaded to the bolt 24, one on each side of the balance lever 23.

At 31 are shown fillers the same thickness as the part 20 of the supporting cable 9. The bolt 27, the nut 28, and the washer 29, securely clamp the metal or hard fiber block 30 and the armature 12 to the part 20 of the supporting cable 9. The bolt or standard 27, the head 32 of which is shown in Figure 5, also provides a convenient means for attaching an amplifying cone, a disc, or a sounding board of whatsoever nature desired (not shown). The part 20 of the supporting cable 9 passes through an opening 33, provided near the head 32, of the bolt 27 for that purpose, as will readily be observed from Figure 5.

The armature 12 is provided with two extensions 34, the same being at right angles to the supporting cable 9. These extensions 34 are provided, each, with a hole 35 near its end. The adjusting bolts 36, which pass through the holes 35 in the ends of the extensions 34, are carried by non-magnetic bars 37 and 38, which are attached to the permanent magnet 1. The bolts 36 are provided with cork or fiber cushions 39, which are adjusted by nuts 40, so as to leave a definite (though very slight) clearance 41 between the cushions 39 and the extensions 34 of the armature 12. Thus there is provided a positive check to an excessive vibration or rocking of the armature 12, with respect to the axis of the cable 9, due to excessive magnetic pull from discharges of static, or from excess electrical current and magnetic pull from any cause whatsoever.

It will be seen readily that with the combined and proper adjustment of the levers 6, the arms 23, and the knurled cable-stretching nut 11, on the ends of the supporting cable 9, a practically perfect balance of the armature 12 is afforded, and with no appreciable resistance, or bind, to its free vibration in response to the magnetic pull of the poles 14 of the electromagnets 3 and a practically perfect relation of this armature 12 to the poles 14 is secured and maintained.

An alternate method of providing a check for excessive vibration, is shown in detail in Figure 7. The end of one of the armature extensions 42 is shown received closely, though not with contact, in a recess 43 provided in a hard fiber adjusting block 44. This block 44, by means of a bolt, 45, is supported on a bar 46, equivalent to the bars 38 and 37. The block is adjusted by nuts 47.

The point that it is particularly desired to make clear in this specification is the supporting on a variable tension cable 9, which is also provided with definite, exact and minute means 23—24—25 for rocking the cable to secure lateral balance, of an armature 12, which, by the operation of definite, exact, and minute adjusting means 7—8—6 is brought into an approximately perfect relation to the poles 14 of the electromagnet 3, the armature vibrating in perfect synchronism with the electrical-magnetic impulses. In connection with the foregoing, note the adjusting cushions 39 at each terminal of the arms 34 extending laterally from the armature 12, and designed, though not in actual contact therewith, to prevent excessive vibrations of the armature.

The device described is for the purpose of conveying to a proper amplifier, not shown, but to be attached to the standard 27, the vibrations necessary for the production of natural and clear tones from electrical impulses received from the output of radio receiving sets, or from a telephone, or the output of any device transmitting electrical impulses.

The exact methods in detail by which I accomplish the perfect vibrations of the armature, are more or less of secondary consequence. The armature and the attached amplifier correspond to a tight rope walker, the tight rope being represented by the cable 9. The resistance to the twist of the cable, which is non-circular in cross section, together with the cushions at each terminal of the lateral armature extensions, act as the emergency or balancing pole, or parasol, which a tight rope walker uses. The analogy may be carried still further by making the cable round, instead of rectangular, as shown at 20, but in the event that a round cable is used, the armature securing means, the pivot blocks for the cable, and the like, must be changed accordingly, and, therefore, no showing of the circular cable and its attendant mechanism has been made.

In Figures 9, 10 and 11, I show another detailed arrangement of the parts whereby the principal of an armature supported on a variable tension cable, provided with adjustable balancing supports, vibrates in close proximity to the poles of the permanent magnet.

In this arrangement, the numeral 48 marks an elliptical permanent magnet, to which is attached the combination supporting bars and magnetic poles 49. The armature 50 is supported by the cable 51 which is provided with threaded ends 52 extending through openings in the L projections 53 at the outer ends of the bars 49. The knurled nuts 54 are provided to give variable tension to the cable 51. Two adjustable balancing devices 55, like the one shown in Figure 4, are used to support the cable 51, and are attached to the supporting bars 49. The armature 50 is provided with a lateral extension 56, which, with the adjusting bolt 57, and the cork or fiber cushions 58, prevent excessive vibration, and operate similar to the arrangement shown in cross section in Figure 6. The armature 50 is provided with an extension rod 59 projecting through an opening 60 in one of the bars 49. The purpose of the rod 59 is for convenience in attaching an amplifying cone, or sound amplifying device of whatsoever nature (not shown). At 61 is shown the electromagnet, the electrical impulses of which, effective upon the free fitting core, or armature 50, induce the vibrations of said armature 50 between the permanent magnetic pole bars 49.

The general operation of the device shown in Figures 9 to 11 will be understood readily from what has been stated hereinbefore in connection with the form illustrated in Figures 1 to 6.

As to the stops, the stop of Figure 6, although shown in duplicate, may be used singly, and the stop of Figure 7, although shown singly, may be used in duplicate.

What is claimed is:—

1. In a device of the class described, a flexible member, an armature carried by the flexible member, means for adjusting the tension of the flexible member, and means for imparting axial rotary adjustment to the flexible member.

2. In a device of the class described, a flexible member, an armature carried by the flexible member, means for adjusting the tension of the flexible member, means for imparting axial rotary adjustment to the flexible member, and means for limiting the longitudinal vibration of the armature on the axis of the flexible member.

3. In a device of the class described, a flexible member, an armature carried by the flexible member, means for imparting axial rotary adjustment to the flexible member, and means for limiting the longitudinal vibration of the armature on the axis of the flexible member.

4. In a device of the class described, clamping devices, a flexible member mounted in the clamping devices, an armature carried by the flexible member and located between the clamping devices, and mechanism for adjusting the clamping devices toward and away from each other.

5. In a device of the class described, levers, fulcra for the levers, means for imparting an adjusted tilting movement to the levers, clamping devices on the levers, a flexible member mounted in the clamping devices, and an armature carried by the flexible member.

6. In a device of the class described, clamping devices, a flexible member mounted for rotary adjustment in the clamping devices, means for imparting rotary adjustment to the flexible member in the clamping devices, mechanism for operating the clamping devices to cause them to grip the flexible member, and an armature carried by the flexible member and located between the clamping devices.

7. In a device of the class described, levers and fulcra therefor, a mechanism for imparting an adjusted tilted movement to the levers, clamping devices carried by the levers, a flexible element having rotary adjustment in the clamping devices, means for imparting rotary adjustment to the flexible element, means for operating the clamping devices to cause them to hold the flexible element, and an armature mounted on the flexible element and located between the clamping devices.

8. In a device of the class described, levers and fulcra therefor, a mechanism for imparting an adjusted tilted movement to the levers, clamping devices carried by the levers, a flexible element having rotary adjustment in the clamping devices, means for imparting rotary adjustment to the flexible element, means for operating the clamping devices to cause them to hold the flexible element, means for adjusting the tension of the flexible element, means for limiting the longitudinal vibrations of the armature on the axis of the flexible member, which flexible member supports the armature.

9. In a device of the class described, an armature to which is attached an amplifying device of any kind or nature whatsoever, a flexible member supporting the armature, means for adjusting the tension of the flexible member, means for imparting axial rotary adjustment to the flexible member, means of adjusting the flexible member, and the armature carried by the flexible member, either toward or away from the poles of the electromagnet, clamping devices, mounted upon adjusting mechanism, and being within themselves capable of imparting axial rotary adjustment to the flexible member which they support, and means for limiting the longitudinal vibrations of the armature on the axis of the flexible member.

In testimony that I claim the foregoing as my own, I have hereto affixed my signature.

CORYDON W. BLACK.